United States Patent
Steffensen et al.

(10) Patent No.: US 11,988,449 B2
(45) Date of Patent: May 21, 2024

(54) SPRAY DRYING APPARATUS WITH A PLENUM CHAMBER BELOW A PERFORATED BOTTOM OF A SPRAY DRYING CHAMBER

(71) Applicant: GEA Process Engineering A/S, Søborg (DK)

(72) Inventors: Mads Lund Steffensen, Søborg (DK); Kristian Mark Ingvorsen, Søborg (DK); Henrik Schwartzbach, Søborg (DK)

(73) Assignee: GEA PROCESS ENGINEERING A/S, Søborg (DK)

( * ) Notice: Subject to any disclaimer, the term of this patent is extended or adjusted under 35 U.S.C. 154(b) by 340 days.

(21) Appl. No.: 17/442,476

(22) PCT Filed: Mar. 25, 2019

(86) PCT No.: PCT/DK2019/050103
§ 371 (c)(1),
(2) Date: Sep. 23, 2021

(87) PCT Pub. No.: WO2020/192852
PCT Pub. Date: Oct. 1, 2020

(65) Prior Publication Data
US 2022/0163258 A1    May 26, 2022

(51) Int. Cl.
*B01D 1/18* (2006.01)
*F26B 3/12* (2006.01)
(Continued)

(52) U.S. Cl.
CPC ............... *F26B 3/12* (2013.01); *B01D 1/18* (2013.01); *F26B 17/04* (2013.01); *F26B 25/10* (2013.01)

(58) Field of Classification Search
CPC ............ B01D 1/18; F26B 17/04; F26B 17/045
See application file for complete search history.

(56) References Cited

U.S. PATENT DOCUMENTS

| 2,068,841 | A | * | 1/1937 | Bowen | B01D 1/18 |
| | | | | | 159/4.03 |
| RE22,090 | E | * | 5/1942 | Powell | B29C 35/04 |
| | | | | | 19/305 |

(Continued)

FOREIGN PATENT DOCUMENTS

| DE | 19740858 C1 * | 10/1998 | B01D 1/18 |
| DE | 10247412 A1 * | 4/2004 | B01F 5/205 |

(Continued)

OTHER PUBLICATIONS

International Search Report issued in corresponding PCT Application No. PCT/DK2019/050103, dated Dec. 20, 2019, pp. 1-3.

*Primary Examiner* — Jonathan Luke Pilcher
(74) *Attorney, Agent, or Firm* — Robinson & Cole LLP

(57) ABSTRACT

A spray drying apparatus has a spray drying chamber; a liquid feed atomizer; a drying gas disperser; a perforated bottom; and a plenum chamber with an outlet below the perforated bottom. At least one guide plate is provided in the plenum chamber to direct gas, which is passing through the perforated bottom into the plenum chamber, towards the bottom of the plenum chamber. The guide plates have lower edges extending on average down to at least half-way between the perforated bottom of the spray drying chamber and the bottom of the plenum chamber.

19 Claims, 5 Drawing Sheets

(51) Int. Cl.
*F26B 17/04* (2006.01)
*F26B 25/10* (2006.01)

(56) References Cited

U.S. PATENT DOCUMENTS

| | | | | |
|---|---|---|---|---|
| 3,615,723 | A | * | 10/1971 | Meade ................ A23L 3/46 426/453 |
| 3,741,273 | A | * | 6/1973 | Meade ................ F26B 3/12 159/4.03 |
| 4,116,756 | A | * | 9/1978 | Quee ................ F26B 17/04 34/236 |
| 4,351,849 | A | * | 9/1982 | Meade ................ A23G 3/0205 426/294 |
| 4,504,451 | A | * | 3/1985 | Quee ................ B01D 53/501 423/243.1 |
| 4,784,878 | A | * | 11/1988 | Haak ................ B01J 2/003 118/313 |
| 5,139,612 | A | * | 8/1992 | Andersen ................ B01D 1/18 202/205 |
| 6,151,798 | A | * | 11/2000 | Petersen ................ B01D 1/18 34/304 |
| 2010/0213141 | A1 | * | 8/2010 | Griffin ................ C02F 1/12 210/182 |
| 2013/0206342 | A1 | * | 8/2013 | Dahmes ................ C08H 1/00 159/48.1 |

FOREIGN PATENT DOCUMENTS

| | | | | |
|---|---|---|---|---|
| DE | 10247413 | A1 | * 4/2004 | .............. B01F 5/205 |
| DE | 10247414 | A1 | * 4/2004 | .............. B27N 1/0254 |
| DE | 102006058627 | B3 | * 6/2008 | .............. B01F 5/205 |
| DK | 201870454 | A1 | 7/2018 | |
| GB | 2278603 | A | * 12/1994 | .............. B01D 1/18 |
| NL | 8600599 | A | * 10/1987 | .............. B01D 1/18 |
| NL | 8600600 | A | * 10/1987 | .............. B01D 1/18 |
| WO | 9002914 | | 3/1990 | |
| WO | WO-9311844 | A1 | * 6/1993 | .............. A23K 20/30 |
| WO | 9809700 | A1 | 3/1998 | |
| WO | WO-2010039250 | A1 | * 4/2010 | .............. B01D 1/14 |

* cited by examiner

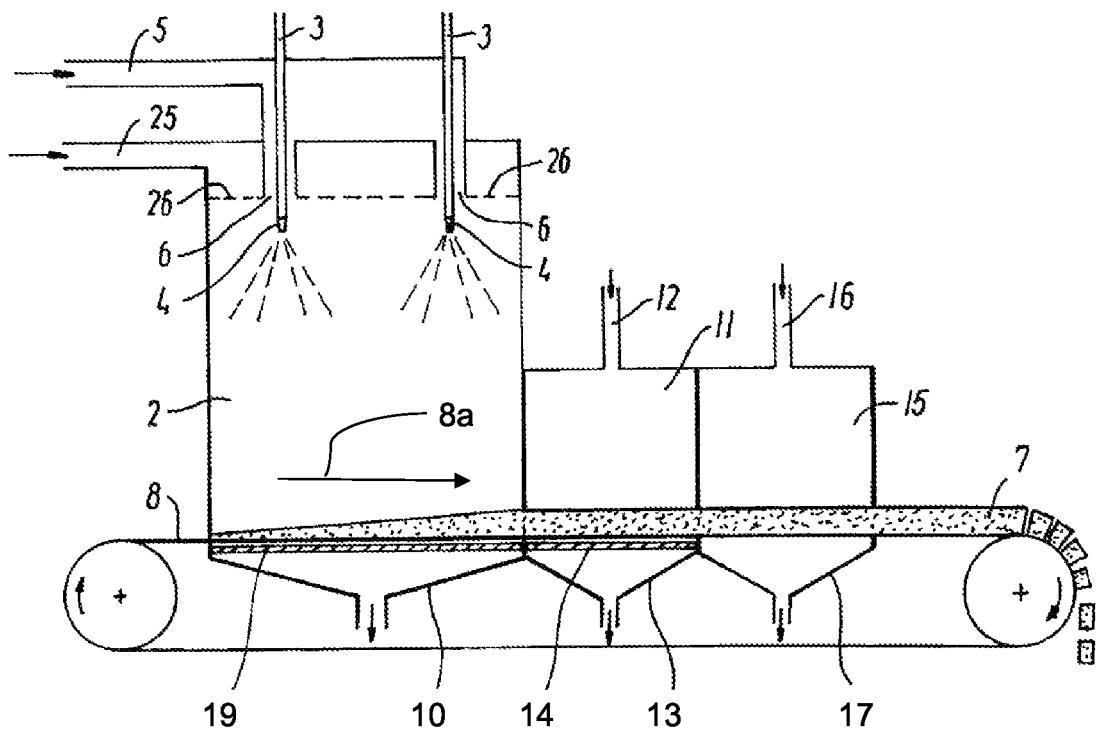
Prior art Fig. 1
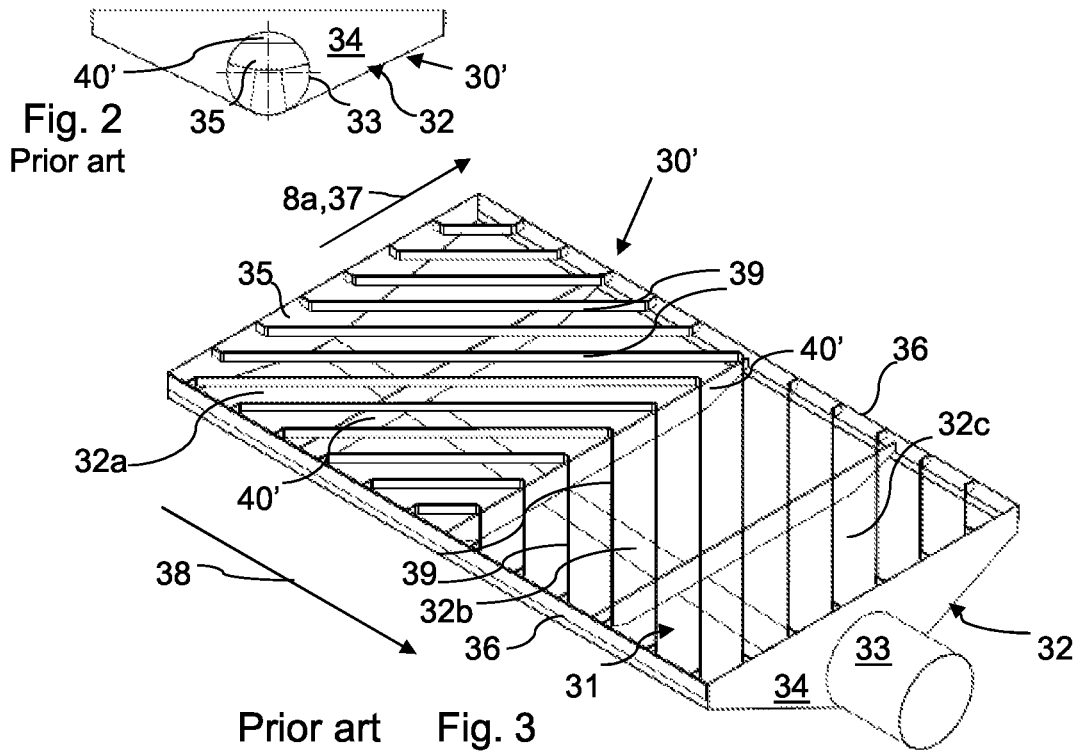
Fig. 2
Prior art
Prior art Fig. 3

SPRAY DRYING APPARATUS WITH A PLENUM CHAMBER BELOW A PERFORATED BOTTOM OF A SPRAY DRYING CHAMBER

CROSS REFERENCE TO RELATED APPLICATION

The instant application is a U.S. National Stage application of and claims priority to PCT/DK2019/050103, filed on Mar. 25, 2019, the subject matter of this application is hereby incorporated by reference in its entirety.

FIELD OF THE INVENTION

The present invention relates to a spray drying apparatus. In particular, the present invention relates to a spray drying apparatus having, inter alia, a spray drying chamber; a liquid feed atomizer; a drying gas disperser; a perforated bottom; at least one plenum chamber below the perforated bottom; and an outlet of said plenum chamber, wherein said plenum chamber has a perforated ceiling, which is provided by an underside of said perforated bottom, and a bottom.

BACKGROUND

A spray drying apparatus is disclosed in WO 98/09700 A1, which is incorporated herein by reference, and spray drying apparatuses of this kind is e.g. used for drying or transforming sticky, hygroscopic, thermoplastic, and/or slowly crystallizing dairy and food products into freely flowing, possibly agglomerated powders in a gentle and efficient way.

Though reference is herein made to spray drying, it should be understood that herein "spray drying" encompasses "spray cooling" i.e. processes whereby a spray is transformed into congealed particles as well as processes whereby a spray is transformed into dried particles, as referred to in WO 98/09700 A1. A commercially used process of this kind is the so-called FILTERMAT® process.

Another known apparatus of the kind mentioned by way of introduction is disclosed in WO 90/02914 A1.

By these known apparatuses the perforated bottom of the spray drying chamber, and thus the ceiling of the plenum chamber, is provided by a perforated conveyor belt having a direction of travel. Dried, congealed, etc., particles are deposited on the conveyor belt through which the drying gas is flowing into the plenum chamber, and the particles deposited on the conveyor belt are transported by the conveyor belt to adjacent stations for further processing and subsequent collection as product.

While the above-mentioned publications are primarily concerned with providing for even deposition of the particles on the conveyor belt, little is mention about the plenum chamber below the conveyor belt.

However, though the particles are indeed intended to be deposited on the conveyor belt and most of the particles are deposited on the conveyor belt, a small amount of particles are transferred through the conveyor belt to the plenum chamber. These particles are generally carried along with the drying gas through the plenum chamber and out the outlet to be removed from the drying gas in a dust extracting device, e.g. a filter, e.g. a bag filter, a cyclone, etc. It is however an observation of the present inventors that occasionally such particles are deposited in the plenum chamber on the bottom thereof. Accordingly, the plenum chamber may need to be cleaned from time to time, since over time deposits of particles in the plenum chamber can be substantial. Particles deposited in the plenum chamber pose a problem due to issues such as a risk of fire or explosion in the plenum chamber; hygienic problems; increased belt friction between the conveyor belt and a supporting structure supporting the conveyor belt; and increased flow resistance against the flow of drying gas through the plenum chamber. Cleaning of the plenum chamber may be performed mechanically; by washing, e.g. by means of so-called "cleaning-in-place" or CIP nozzles; etc.

SUMMARY OF THE INVENTION

It is an object of the present invention to avoid or minimize these problems of the prior art apparatuses.

This is obtained according to the invention by a spray drying apparatus as mentioned by way of introduction, wherein at least one guide plate is provided in the at least one plenum chamber to direct gas, which is passing through the perforated ceiling into the plenum chamber, towards the bottom of the plenum chamber, said guide plate having a lower edge and a longitudinal extent extending across an outlet direction towards the outlet, said guide plate through the longitudinal extent thereof extending on average down to at least half-way between the perforated ceiling and the bottom of the plenum chamber.

Hereby is obtained that drying gas that has passed through perforated ceiling into the plenum chamber on an up-stream side or far side of the guide plate relative to the outlet, is directed toward the bottom of the plenum chamber to pass below the guide plate before being directed towards the outlet along the bottom. Hereby a flow of gas is provided across the bottom of the plenum chamber. This flow carries along or entrains particles that have passed through the perforated bottom of the spray drying chamber and thus through the perforated ceiling of the plenum chamber into the latter. Thus, such particles, that would otherwise have been deposited on the bottom of the plenum chamber, may be carried along with the drying gas to be transported out through the outlet of the plenum chamber instead of being deposited inside the plenum chamber.

Depending on the kind of the substance being processed in the spray drying chamber the velocity of the flow of drying gas across the bottom of the plenum chamber may be at least 1 m/s to obtain the above mentioned effect, possibly at least 2 m/s and e.g. up to 20 m/s.

While the ceiling of the plenum chamber is perforated, the bottom thereof is generally solid. Thus, the gas that enters the plenum chamber will generally only enter through the perforated ceiling.

It should be understood that herein "perforated" as used in relation to the bottom of the spray drying chamber and the ceiling of the plenum chamber means open for penetration of gas and thus "perforated" encompasses porous materials that are suited for e.g. a conveyor belt as disclosed herein.

In an embodiment more such guide plates are provided at mutual distance to extend across said outlet direction, and on average a vertical distance from the bottom of the plenum chamber to the lower edge of a first guide plate is smaller than a corresponding vertical distance from the bottom of the plenum chamber to the lower edge of a second guide plate closer the outlet than the first guide plate. This promotes obtaining a flow of the drying gas across the majority of the bottom of the plenum chamber with a sufficient velocity for obtaining the effect of transporting particles out of the plenum chamber through the outlet.

In an embodiment at a side wall of the plenum chamber, a bias guide plate is provided to extend at an acute angle relative to said side wall as seen in a vertical plane perpendicular to the bias guide plate, said acute angle having an apex pointing downwards, said angle preferably being in the range of 10° to 70°, especially of 10° to 40°, and more especially of 15° to 30°, a lower edge of said bias plate having a distance from said side wall and the bottom of the plenum chamber. By providing such bias guide plate, part of the drying gas, that has entered the plenum chamber above the bias guide plate and/or the side wall, will be directed to the bottom of the plenum chamber adjacent the side wall to provide a flow of drying gas across the bottom adjacent the side wall. Thus, it is possible to provide a flow of gas across parts of the bottom remote from the outlet and/or close to side walls of the plenum chamber.

In a practical embodiment wherein the bottom of the spray drying chamber and the ceiling comprise a perforated conveyor belt, a supporting structure is provided below the ceiling for supporting the ceiling, including the conveyor belt, the conveyor belt having a direction of travel, and the plenum chamber has a substantially rectangular horizontal cross section with a first dimension extending in a first direction parallel to the direction of travel of the conveyor belt and a second dimension extending in a second direction perpendicular to the direction of travel of the conveyor belt.

In a further practical embodiment, the at least one guide plate is a part of said support structure.

In another practical embodiment the outlet is provided in an outlet side wall extending in the first direction.

In yet a practical embodiment the bottom of the plenum chamber is generally trough-shaped and sloping downwards towards the outlet. This facilitates cleaning of the plenum chamber whether by mechanical means or by flushing fluids e.g. liquids, possibly through nozzles positioned inside the plenum chamber, such as so-called cleaning-in-place (CIP) nozzles.

In an embodiment the at least one guide plate is extending in the first direction i.e. in the direction of travel of the conveyor belt.

In general, the plenum chamber may be oriented with the outlet side wall and the guide plates extending in the direction of travel of the conveyor belt, and more plenum chamber may be positioned in a row below the conveyor belt for their outlets to be connected to a common outlet conduit as it is per se known in the art. The outlets of more plenum chambers may thus be connected to a common outlet conduit leading to a common dust extracting device (filter device, cyclone, etc.). In the alternative the outlets of two or more plenum chambers may be connected with one dust extracting device while outlets of other plenum chambers are connected to a different dust extracting device, or the outlet of all plenum chambers may be connected with an individual dust extracting device, etc.

In a practical embodiment the at least one guide plate has lower edge extending at a distance from the bottom of the plenum chamber substantially throughout the longitudinal extent of the guide plate.

In a further embodiment the distance from the lower edge of the guide plate to the bottom of the plenum chamber is substantially uniform throughout the longitudinal extent of the guide plate. In an alternative embodiment the distance from the lower edge of the guide plate to the bottom of the plenum chamber is enlarged at ends in the longitudinal direction of the guide plate relative to said distance at the longitudinal midpoint of the guide plate. In yet an alternative embodiment the distance from the lower edge of the guide plate to the bottom of the plenum chamber is reduced at ends in the longitudinal direction of the guide plate relative to said distance at the longitudinal midpoint of the guide plate. Thus, it is possible to control the pattern of the drying gas flow across the bottom of the plenum chamber.

In an embodiment the at least one guide plate has an up-stream side and a down-stream side relative to the outlet direction and the up-stream side, at least at the lower edge, forms an angle relative to vertical with an upward pointing apex said angle being in the range of 0 to 90°. By selecting said angle it is possible to further influence the flow of drying gas in the plenum chamber, especially across the bottom thereof, thereby optimizing the effect of the guide plate or guide plates.

In a further embodiment the at least one guide plate has an up-stream side and a down-stream side relative to the outlet direction and the up-stream side, at least at the lower edge, is curved downwards towards the outlet. By selecting said curve or curvature it is possible to further influence the flow of drying gas in the plenum chamber, especially across the bottom thereof, thereby optimizing the effect of the guide plate or guide plates.

In a further embodiment the at least one guide plate has an up-stream side and a down-stream side relative to the outlet direction and a substantial thickness, and wherein the lower edge is rounded at the up-stream side. By providing such rounded edge, it is possible to further influence the flow of drying gas in the plenum chamber, especially across the bottom thereof, thereby optimizing the effect of the guide plate or guide plates.

In an embodiment the spray drying chamber at the perforated bottom has a rectangular cross section and at an upper end thereof has a cross section shaped as a general rectangle with rounded corners, the spray drying chamber having vertical side walls between the bottom end the upper end.

Hereby is avoided a problem that for some operating conditions occur with drying chambers having side walls that converge in an upwards direction, namely that particles or powder can form a layer of deposits on an inner surface of the chamber walls. In some of these cases, the amount of powder deposit on the wall is so high, that powder lumps fall down on the conveyor belt causing dried particles or powder to fall through the conveyor belt and powder lumps that are not dried to appear in the product. Without wishing to be bound by theory, the vertical side walls provide for larger distance to the liquid feed atomizer and the rounded corners appear to facilitate a flow of drying gas from the drying gas disperser to enhance drying of the atomized liquid feed and reduce particle or powder deposit on the inner surface of the side wall, especially at the upper parts thereof.

The drying gas disperser may be of a kind as disclosed in Danish patent application No. DK PA 2018 70454, which is incorporated herein by reference, and in an embodiment the drying gas disperser has a diameter substantially equal to the length of a minor side of the rectangular cross section of the spray drying chamber. In an alternative embodiment the drying gas disperser has a diameter smaller than the length of a minor side of the rectangular cross section of the spray drying chamber.

BRIEF DESCRIPTION OF THE DRAWINGS

In the following the invention will be explained in further detail by way of non-limiting examples of embodiments, having reference to the schematic drawings, in which FIG. 1 shows a prior art spray drying apparatus in which the present invention may be incorporated;

FIG. 2 is an end view of a prior art type plenum element;

FIG. 3 is a perspective view of the plenum element in FIG. 2;

Figure 4:
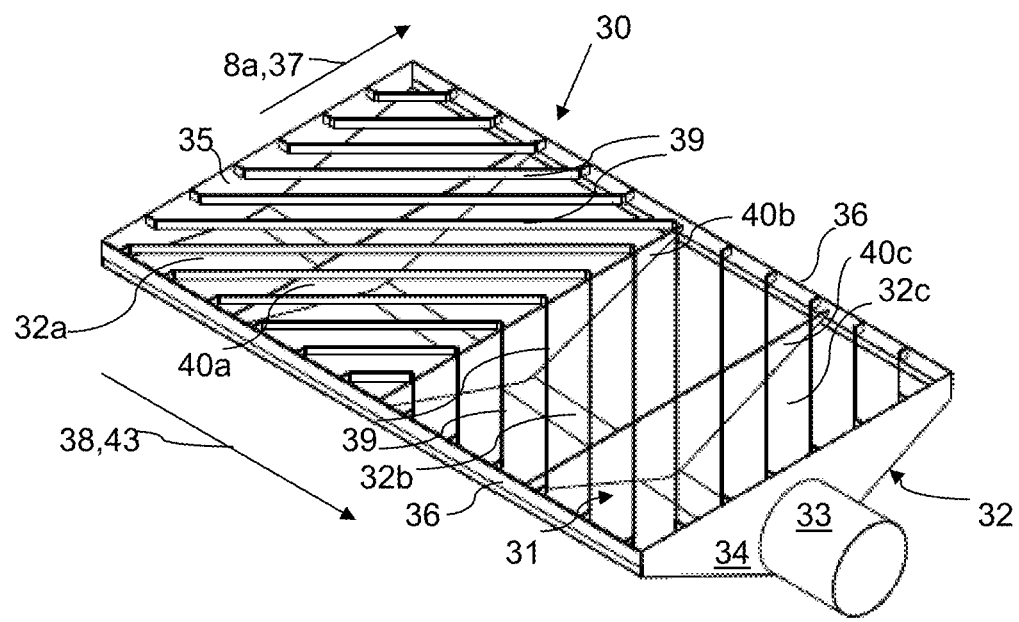
FIG. 4 is a view corresponding to FIG. 3, but showing a plenum element embodying the present invention.
Figure 10:
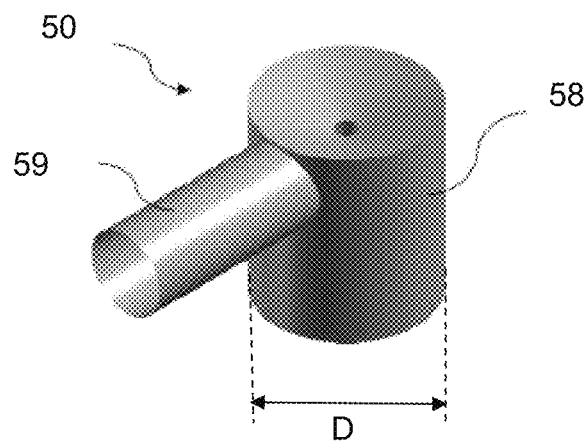

FIGS. 9(a)-(e) shows details of variants of the plenum element of FIG. 4;

FIG. 10 is a perspective view of a drying gas disperser; and

Figure 11:
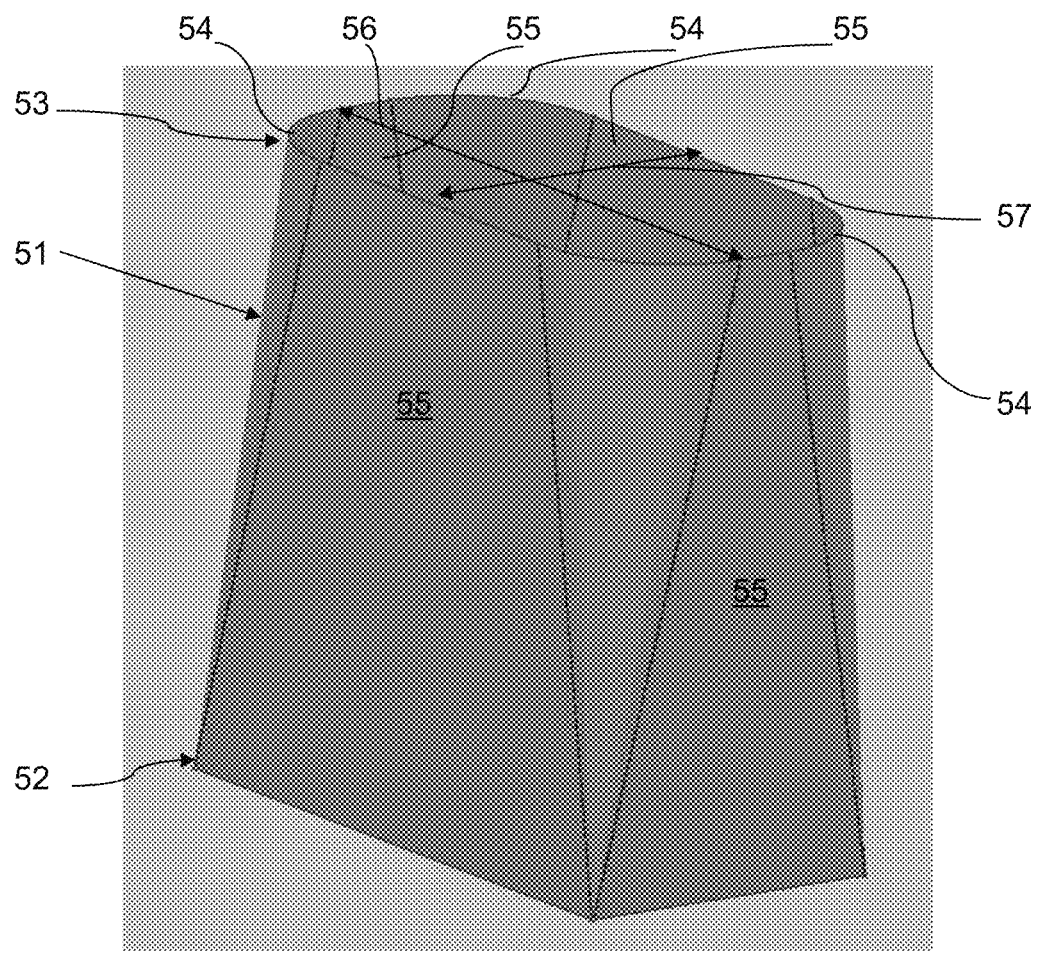

FIG. 11 is a perspective view of a spray drying chamber wall according to the present invention.

DETAILED DESCRIPTION

Referring to FIG. 1, a spray drying apparatus indicated generally by 1 is shown, which comprises a spray drying chamber 2, into which a feed stream supplied through conduits 3 is atomized through liquid feed atomizers 4, such as pressure nozzles or rotary atomizers, and brought into contact with a drying gas supplied to the drying chamber through a conduit 5 and annular openings 6 surrounding conduits 3. Furthermore, openings 26 in the ceiling of the chamber 2 are provided for the introduction of supplementary drying gas, supplied through conduit 25. Thus conduits 5 and 25 together with openings 6 and 26 provide a drying gas disperser. By the contact with the drying gas, the atomized feed stream is converted into sticky, partially dried particles, which are collected as a layer 7 on the surface of a perforated conveyor belt 8, forming at least partially a perforated bottom of chamber 2, by suction through a plenum element 10. The perforated conveyor belt 8, or rather the section thereof forming at least partially a perforated bottom of the spray drying chamber, has a direction of travel 8a during operation.

By the suction, a pressure difference over the perforated conveyor belt of about 20 mm $H_2O$ and a pressure difference over the collected layer, leaving the chamber, of about 10 mm $H_2O$ is established. Thus, the ratio between the pressure difference over the screen means and the pressure difference over the product layer is about 2.0 in the spray drying chamber 2. Below the perforated conveyor belt 8, an optional restriction member 19, comprising a number of perforated plates, is located to cover, together with the perforated conveyor belt 8, the bottom area of spray drying chamber 2. By means of the optional restriction member 19 the total pressure difference over the perforated bottom of the spray drying chamber 2, including the perforated conveyor belt 8 and the optional restriction member 19, may be adjusted.

From the chamber 2, the collected layer 7 is transferred to a drying chamber 11, by means of the perforated conveyor belt 8, in which chamber 11, layer 7 is e.g. subjected to further drying by means of a hot drying gas, introduced in chamber 11 through a conduit 12 and withdrawn by suction through a second plenum element 13, located below chamber 11. In plenum element 13 a further perforated plate 14 is located below the perforated conveyor belt 8, in the immediate vicinity thereof. From drying chamber 11, the product layer 7 is transferred to a cooling chamber 15 by means of the perforated conveyor belt 8, in which chamber 15 it is e.g. brought into contact with dehumidified, cooled air, supplied through conduit 16 and withdrawn through a third plenum element 17, located below the perforated conveyor belt 8, beneath chamber 15. After cooling, the product leaves chamber 15 and the perforated conveyor belt 8 as shown schematically to the right in the FIG. 1.

FIGS. 2 and 3 show an example of a prior art type plenum element 30' usable as e.g. the plenum element 10 shown in FIG. 1. The plenum element 30' defines a plenum chamber 31 with a bottom 32 that is generally trough-shaped and slopes downwards towards an outlet 33. The bottom 32 is in the example provided by three plane sections 32a, 32b and 32c. The outlet 33 is provided in an outlet side wall 34 of the plenum chamber 31. Opposite the outlet side wall 34, a minor, substantially vertical, end side wall 35 is provided. The outlet side wall 34 and the end side wall 35 are parallel and are connected by longitudinal side walls 36 whereby the plenum chamber has a substantially rectangular horizontal cross section with a first dimension extending in a first direction 37 and a second dimension extending in a second direction 38. Opposite the bottom 32 a supporting structure is provided comprising bias slats 39, and cross slats 40 extending between the longitudinal side walls 36, below the bias slats 39 to support the latter. The bias slats 39 provides a support for a perforated ceiling of the plenum chamber 31 provided by the perforated bottom of the spray drying chamber 2. In the shown example the plenum element 30' is intended to be installed below the spray drying chamber 2 so that the first direction 37 is parallel to the direction of travel 8a of the perforated conveyor belt 8 and the second direction 38 is perpendicular to the direction of travel 8a.

It should be noted that though a single plenum element 10 is shown in FIG. 1 it is possible to provide several plenum elements 30' in a side-by-side relationship along the direction of travel 8a. In such case the outlets 33 may be connected with a common conduit for guiding the drying gas, that has passed the plenum chambers, to a filter.

Referring now to FIGS. 4 to 7 a plenum element 30 embodying the present invention is disclosed. The plenum element 30 is to a large degree identical to the plenum element 30' described above and in the following similar elements are designated by the same numbers.

Figure 7:
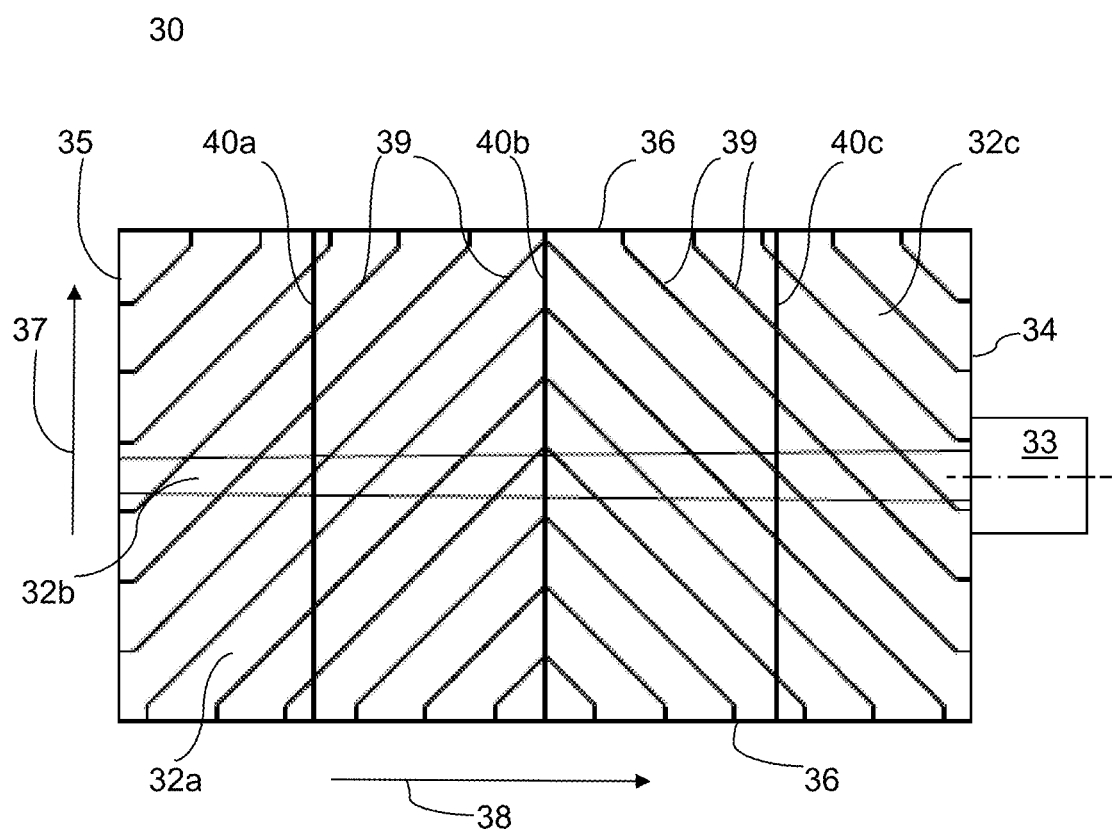
FIG. 7 is a top view of the plenum element of FIG. 4.

Thus, the embodiment of the plenum element 30, shown in FIGS. 4 to 7, is identical to the plenum element 30' except for the fact that cross slats 40' has been substituted by guide plates 40. It is noted that in a top view as shown in FIG. 7 the plenum element 30 and plenum element 30' will look identical.

Figure 5:
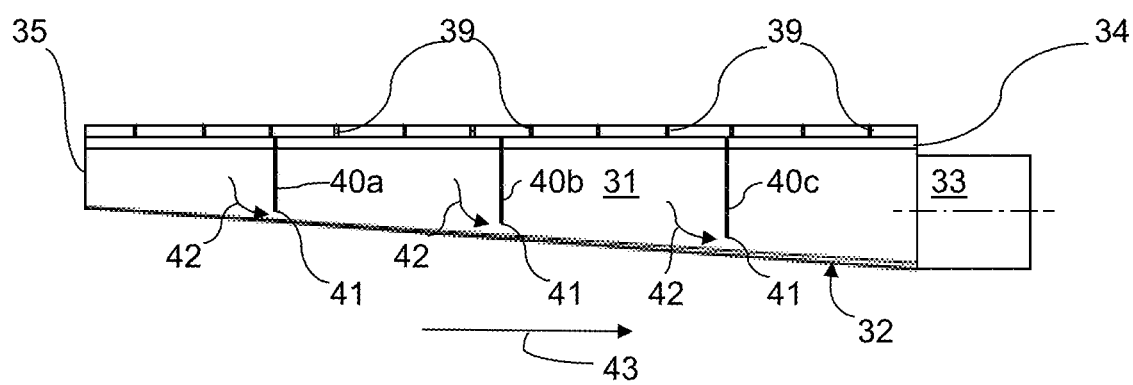
FIG. 5 is a longitudinal cross section of the plenum element in FIG. 4.
Figure 6:
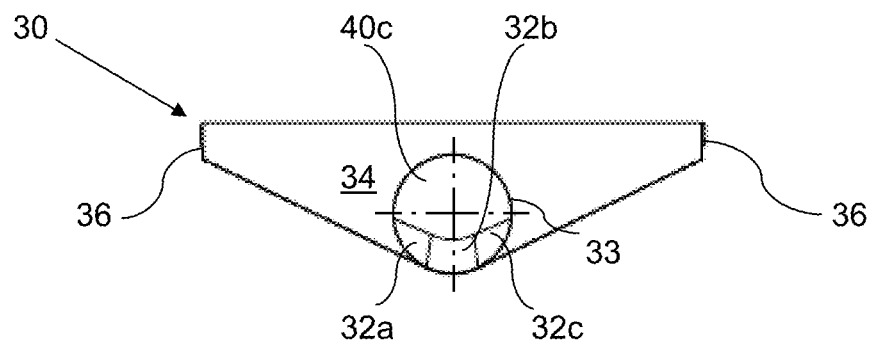
FIG. 6 is an end view corresponding to FIG. 2, but showing the plenum element of FIG. 4.

According to the present invention guide plates 40a, 40b, 40c are provided to direct gas, which has passed through the perforated ceiling into the plenum chamber 31, towards the bottom 32 of the plenum chamber, as indicated by arrows 42 in FIG. 5, before said gas passed below a lower edge 41 of the respective guide plates 40a, 40b, 40c for said gas to flow along the bottom 32 towards the outlet 33 in an outlet direction 43.

In the present embodiment the guide plates 40a, 40b, 40c each has a longitudinal extent extending in the first direction 37, i.e. across the second direction 38 which constitutes a general outlet direction 43 towards the outlet 33. The lower edges 41 of the guide plates 40a, 40b, 40c extend, in the present embodiment, through their respective longitudinal extent parallel to the bottom 32 of the plenum chamber 31, and in the present embodiment the guide plates 40a, 40b, 40c extend, as indicated in FIG. 5, more than half-way down between the perforated ceiling, that will be supported by the bias slats 39, and the bottom 32 of the plenum chamber 31.

In the embodiment shown in FIGS. 4 to 7 three guide plates 40a, 40b, 40c are provided which are plane and vertical and mutually placed generally equidistantly and in parallel. However, it should be noted that at another number of guide plates may be used, such as one, two, four, five, six or even more depending, inter alia, on the actual size of the plenum chamber. Further variations are possible such as the guide plates being non-parallel, non-plane, not equidistantly spaced, etc.

In the present embodiment the guide plates 40a, 40b, 40c are part of the supporting structure and support the bias slats 39. However, it is also possible that the guide plates do not form part of the supporting structure.

Inter alia it is foreseen that the guide plates may be movable or removable for cleaning of the plenum chamber 31.

In operation the guide plates 40a, 40b, 40c will, as mentioned, direct gas that has passed through the perforated ceiling supported by the bias slats 39 towards the bottom 32 of the plenum chamber 31 to create a gas flow along the bottom 32 towards the outlet 33. The guide plates 40a, 40b, 40c may be dimensioned to create a gap between the respective lower edges 41 and the bottom 32 to promote a flow pattern across the bottom whereby the speed of the flow is at least 1 m/s or more e.g. in the range of 2 to 20 m/s, at least across the majority of the bottom 32. The flow across the bottom 32 may prevent particles or powder, that has penetrated the perforated ceiling and entered the plenum chamber 31, like the gas, from settling in the plenum chamber 31 and instead being carried along with the gas out the outlet 33 to be finally captured in a filter, not shown.

The actual need for speed of flow for a given apparatus may depend on different parameters, such as the nature of the material to be processed; the nature of the perforated bottom of the spray drying chamber 2, i.e. the perforated ceiling of the plenum chamber 31; etc.

The sizes of the gaps largely influence the speed of the flow across the bottom and to create a flow pattern with a generally even speed of the flow the gap between the lower edge 41 of a given guide plate 40a, 40b, 40c should be larger the closer the guide plate is to the outlet 33. Accordingly, the gap, i.e. the vertical distance, between the lower edge of guide plate 40c and the bottom 32 is larger than the gap between the lower edge of the guide plate 40b and the bottom 32 which in turn is larger than the gap between the lower edge of the guide plate 40c and the bottom 32. Hereby a relatively even flow pattern in respect of speed may be created while avoiding pressure build-up due to narrow gaps.

In an alternative embodiment the vertical distances between the bottom 32 and two or more of the guide plates 40a, 40b, 40c are generally equal.

As mentioned, in the present embodiment the lower edges 41 of the guide plates 40a, 40b, 40c extend in parallel to the bottom 32. It is however possible to provide gaps that are e.g. more narrow at the longitudinal side walls 36 than in the middle of the plenum chamber 31, i.e. at areas at the longitudinal midpoint of respective guide plates, to promote the speed of the flow at the longitudinal side walls 36 relative to the flow at the middle of the plenum chamber 31, or vice versa.

It should be noted that some of the gas may by-pass the guide plates 40a, 40b, 40c by flowing above the guide plates 40a, 4b, 4c between the bias slats 39, but the intended effect of the present invention will not be jeopardized as long as a sufficient amount of gas flows beneath the guide plates 40a, 40b, 40c.

Figure 8:
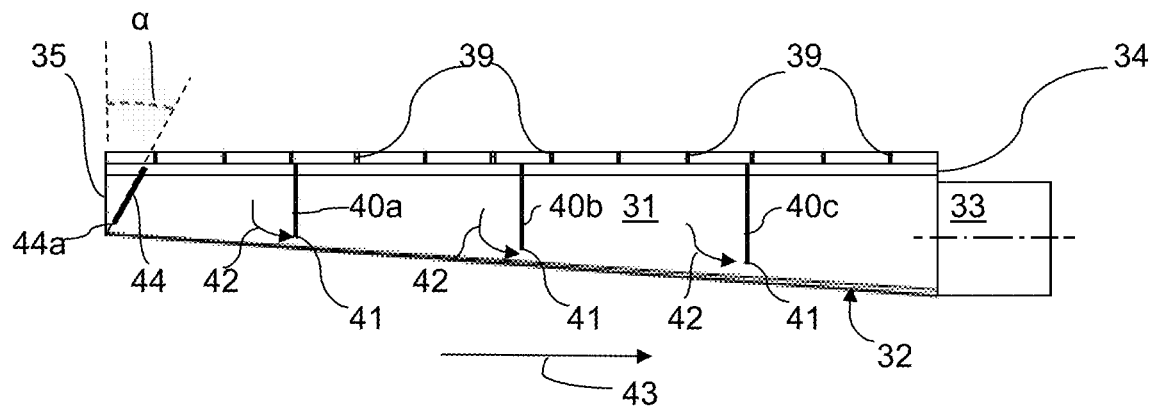
FIG. 8 is a view corresponding to FIG. 5, but showing a variant of the plenum element of the invention.

FIG. 8 shows a variant of the embodiment shown in FIGS. 4 to 7. In this variant a bias guide plate 44 has been added in the plenum chamber 31. The bias guide plate 44 is, in the present embodiment, extending in the second direction 38, like the guide plates 40a, 40b, 40c, but it is biased or angled relative to the vertical end side wall 35 at an angle α. A gap is present between a lower edge 44a of the bias guide plate 44 and the end side wall 35 and the bottom 32, respectively. The angle α may be in the range of 10° to 70°, especially of 10° to 40°, and particularly of 15° to 30°. The bias guide plate 44 entails that gas, that has passed into the plenum chamber 31 through the ceiling above the bias guide plate 44 will be guided towards the corner between the end side wall 35 and the bottom 32 before that gas is directed along the bottom 32 towards the outlet 33, thereby providing a flow of gas across the area of the bottom 32 most remote from the outlet 33. It should be noted that in case the end side wall 35 is not vertical, but extends somewhat outwardly from the bottom 32 relative to the plenum chamber 31, the angle α in the above ranges will still be found between the end side wall 35 and the bias guide plate 44, the latter extending correspondingly closer to vertical, or even vertically.

FIGS. 9(a) to 9(e) show, in enlarged detail, different variants of the lower part of a guide plate, such as guide plate 40a. It should be noted that though guide plate 40a is used as an example, the variants might be applied to any of the guide plates 40a, 40b, 40c.

Figure 9:
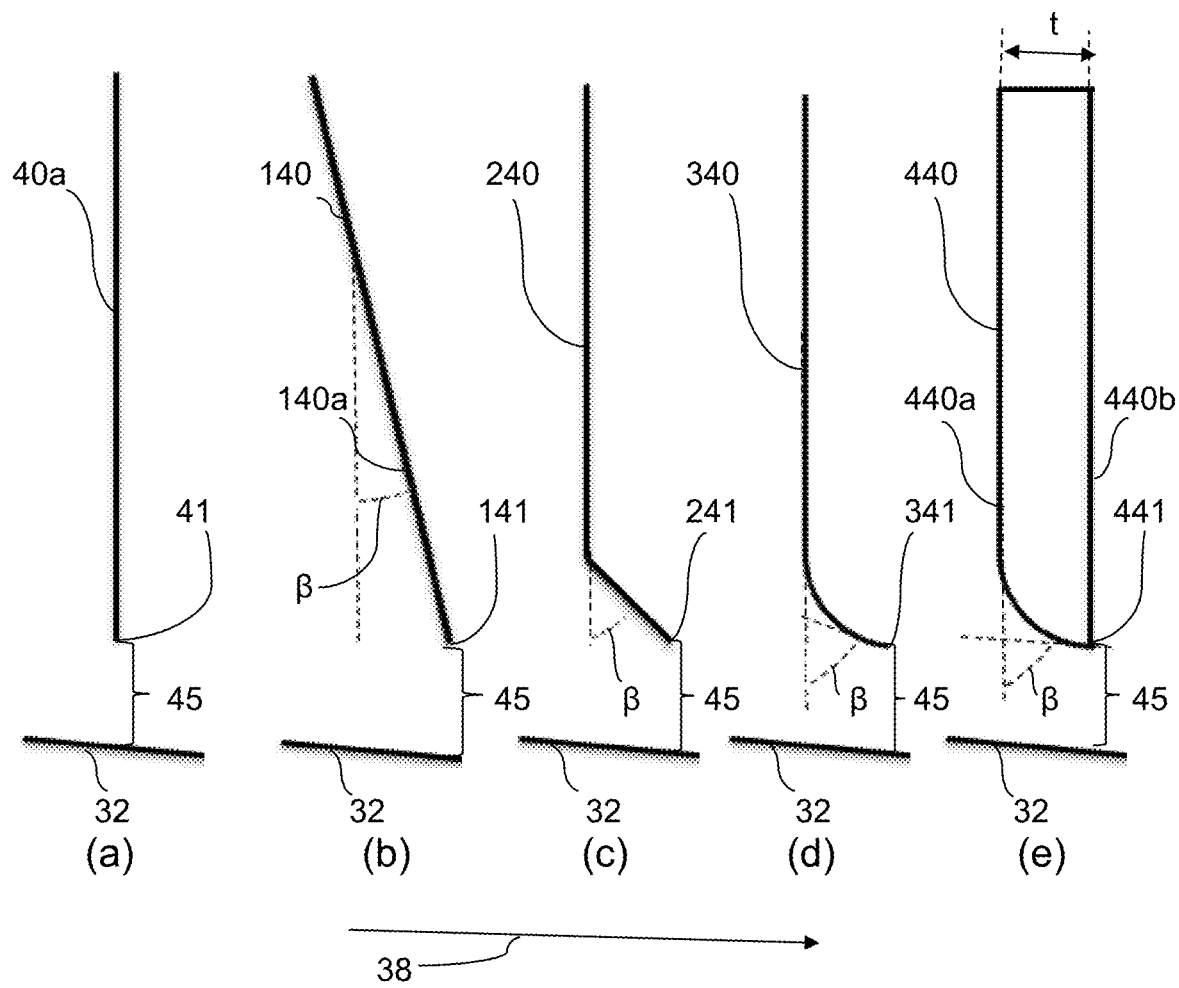

FIG. 9(a) shows an enlarged detail of the guide plate 40a and the bottom 32. It Is noted that the guide plate 40a is plane and vertical and a gap or vertical distance 45 exists between the lower edge 41 and the bottom 32.

To stream-line the flow in the plenum chamber 31 it is possible to e.g. amendment the geometrical properties around the gap 45.

In a first variant, shown in FIG. 9(b) the entire guide plate 140 is tilted at an angle β relative to vertical. Thus the area at the lower edge 141, together with the rest of the guide plate, especially at an up-stream side 140a thereof relative to the outlet direction 43, forms an angle β relative to vertical with an upward pointing apex said angle β being in the range of 0 to 90°, especially closer to 0 than to 90°.

In a second variant shown in FIG. 9(c) the area at the lower edge 241 is angled relative to the rest of the guide plate 240 to provide for the area at the lower edge 241 forming an angle β relative to vertical with an upward pointing apex, said angle being, as indicated, in the range of 0 to 90°.

In a third variant shown in FIG. 9(d) the area of the guide plate 340 at the lower edge 341 is curved to provide an angle β, as indicated, in the range of 0 to 90°, especially closer to 90° than to 0.

In a forth variant shown in FIG. 9(e) the guide plate 440 has an up-stream side 440a and a down-stream side 440b relative to the outlet direction 43 and a substantial thickness (t), and the lower edge 441 is rounded at the up-stream side. Thereby, line in the third variant, the area of the up-stream side 440a of the guide plate 440 at the lower edge 441 is curved to provide an angle β, as indicated, in the range of 0 to 90°, especially close to 90°.

Referring to FIGS. 10 and 11 a drying gas disperser 50 and a circumferential spray drying chamber wall 51 are shown.

The spray drying chamber wall 51 has according to the present invention has a rectangular cross section at a bottom end 52 and at an upper end 53 the spray drying chamber wall 51 has a cross section shaped as a general rectangle with rounded corners 54, the spray drying chamber wall having generally plane, vertical side wall portions 55 between the bottom end 52 the upper end 53. The rectangular cross section has a major side length 56 and a minor side length 57, and the major side length is intended to be parallel with the direction of travel 8a of the conveyor belt 8 when the spray drying chamber wall 51 is implemented in a spray drying apparatus 1 of the type shown in FIG. 1. It is also possible that the cross section of the spray drying chamber wall 51 at the bottom end 52 is quadratic.

By means of the embodiment of the circumferential spray drying chamber wall 51 according to the present invention, a problem observed at drying chambers having side walls that converge conically in an upwards direction, namely that for some operating conditions, particles or powder can form a layer of deposits on an inner surface of the chamber walls, may be reduced or avoided. As also indicated in the opening part of the present description, in some of these cases, the amount of powder deposit on the wall is so high, that powder lumps fall down on the conveyor belt causing dried particles or powder to fall through the conveyor belt and powder lumps that are not dried to appear in the product.

The drying gas disperser 50 is of a kind disclosed in Danish patent application No. DK PA 2018 70454, to which reference is made for detailed description of the construction of the drying gas disperser 50. The drying gas disperser 50 comprises a supply duct section 58 which has a diameter D, and an inlet duct section 59.

In the present example, the drying gas disperser 50 may be mounted on top of the spray drying chamber wall 51 whereby an intermediate ceiling element (not shown) is interposed between the upper end 53 of the spray drying chamber wall 51 and the supply duct section 58 of the drying gas disperser 50.

The diameter D of the supply duct section 58 may be substantially equal to the minor side length 57 of the spray drying chamber wall 51. In the alternative the diameter D of the supply duct section 58 may be smaller than the minor side length 57 of the spray drying chamber wall 51.

What is claimed is:

1. A spray drying apparatus comprising:
a spray drying chamber;
a liquid feed atomizer;
a drying gas disperser;
a perforated bottom;
at least one plenum chamber below the perforated bottom; and
an outlet of said plenum chamber,
wherein said plenum chamber has
a perforated ceiling, which is provided by an underside of said perforated bottom, and
a bottom,
wherein at least one guide plate is provided in the at least one plenum chamber to direct gas, which is passing through the perforated bottom into the plenum chamber, towards the bottom of the plenum chamber,
said at least one guide plate having a lower edge and said at least one guide plate having a longitudinal extent in a longitudinal direction of said at least one guide plate, said at least one guide plate extending across, and thereby at an angle larger than zero relative to an outlet direction towards the outlet,
said at least one guide plate throughout the longitudinal extent thereof extending on average down to at least half-way between the perforated ceiling and the bottom of the plenum chamber.

2. A spray drying apparatus according to claim 1, wherein more of said at least one guide plates are provided to extend across said outlet direction, and wherein on average a vertical distance from the bottom of the plenum chamber to a lower edge of a first guide plate of said at least one guide plate is smaller than a corresponding vertical distance from the bottom of the plenum chamber to a lower edge of a second guide plate of said at least one guide plate closer the outlet than the first guide plate.

3. A spray drying apparatus according to claim 2, wherein at a side wall a bias guide plate is provided to extend at an acute angle relative to said side wall as seen in a vertical plane perpendicular to the bias guide plate, said acute angle having an apex pointing downwards, a lower edge of said bias plate having a distance from said side wall and the bottom of the plenum chamber.

4. A spray drying apparatus according to claim 1, wherein the perforated bottom of the spray drying chamber and the perforated ceiling comprise a perforated conveyor belt, a supporting structure being provided below the perforated ceiling for supporting the perforated ceiling, including the perforated conveyor belt, the perforated conveyor belt having a direction of travel, and the plenum chamber has a substantially rectangular horizontal cross section with a first dimension extending in a first direction parallel to the direction of travel of the conveyor belt and a second dimension extending in a second direction perpendicular to the direction of travel of the conveyor belt.

5. A spray drying apparatus according to claim 4, wherein the at least one guide plate is a part of said support structure.

6. A spray drying apparatus according to claim 5, wherein the outlet is provided in an outlet side wall extending in the first direction.

7. A spray drying apparatus according to claim 6, wherein the bottom of the plenum chamber is generally trough-shaped and sloping downwards towards the outlet.

8. A spray drying apparatus according to claim 4, wherein the at least one guide plate is extending in the first direction.

9. A spray drying apparatus according to claim 1, wherein the at least one guide plate has a lower edge extending at a distance from the bottom of the plenum chamber substantially throughout the longitudinal extent of the at least one guide plate.

10. A spray drying apparatus according to claim 9, wherein the distance from the bottom of the plenum chamber at which the lower edge of the at least one guide plate extends is substantially uniform throughout the longitudinal extent of the at least one guide plate.

11. A spray drying apparatus according to claim 9, wherein the distance from the bottom of the plenum chamber at which the lower edge of the at least one guide plate extends is enlarged at ends in the longitudinal direction of the at least one guide plate relative to said distance from the bottom of the plenum chamber at which the lower edge of the at least one guide plate extends at a longitudinal midpoint of the at least one guide plate.

12. A spray drying apparatus according to claim 9, wherein the distance from the bottom of the plenum chamber at which the lower edge of the at least one guide plate extends is reduced at ends in the longitudinal direction of the at least one guide plate relative to said distance from the bottom of the plenum chamber at which the lower edge of the at least one guide plate extends at a longitudinal midpoint of the at least one guide plate.

13. A spray drying apparatus according to claim 1, wherein the at least one guide plate has an up-stream side and a down-stream side relative to the outlet direction and the up-stream side, at least at the lower edge, forms an angle relative to vertical with an upward pointing apex said angle being in the range of 0 to 90°.

14. A spray drying apparatus according to claim 1, wherein the at least one guide plate has an up-stream side and a down-stream side relative to the outlet direction and the up-stream side, at least at the lower edge, is curved downwards towards the outlet.

15. A spray drying apparatus according to claim 1, wherein the at least one guide plate has an up-stream side and a down-stream side relative to the outlet direction and a substantial thickness, and wherein the lower edge is rounded at the up-stream side.

16. A spray drying apparatus according to claim 1, wherein the spray drying chamber at the perforated bottom has a rectangular cross section and the spray drying chamber has an upper end having a cross section shaped as a general rectangle with rounded corners, the spray drying chamber having vertical side walls between the bottom end the upper end.

17. A spray drying apparatus according to claim 16, wherein the drying gas disperser has a diameter substantially equal to the length of a minor side of the rectangular cross section of the spray drying chamber.

18. A spray drying apparatus according to claim 16, wherein the drying gas disperser has a diameter smaller than the length of a minor side of the rectangular cross section of the spray drying chamber.

19. A spray drying apparatus according to claim 2, wherein at a side wall a bias guide plate is provided to extend at an acute angle relative to said side wall as seen in a vertical plane perpendicular to the bias guide plate, said acute angle having an apex pointing downwards, said angle being in a range of one of: 10° to 70°; 10° to 40°; and 15° to 30°, a lower edge of said bias plate having a distance from said side wall and the bottom of the plenum chamber.

* * * * *